US007585818B2

(12) United States Patent
Segura

(10) Patent No.: US 7,585,818 B2
(45) Date of Patent: Sep. 8, 2009

(54) NONNATURAL GALACTOMANNANS AND METHODS OF USE

(75) Inventor: Michael J. R. Segura, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 546 days.

(21) Appl. No.: 11/125,732

(22) Filed: May 10, 2005

(65) Prior Publication Data

US 2006/0258542 A1 Nov. 16, 2006

(51) Int. Cl.
*C09K 8/60* (2006.01)
*E21B 43/16* (2006.01)
(52) U.S. Cl. .............. 507/211; 166/280.1; 166/305.1; 166/308.1; 507/203; 507/209
(58) Field of Classification Search .............. 166/280.1, 166/308.1, 305.1; 507/211
See application file for complete search history.

(56) References Cited

U.S. PATENT DOCUMENTS

| 4,579,942 | A | * | 4/1986 | Brode et al. .................. 536/84 |
| 4,801,540 | A | | 1/1989 | Hiatt et al. ................ 435/172.3 |
| 4,940,838 | A | | 7/1990 | Schilperoort et al. ......... 800/205 |
| 4,987,071 | A | | 1/1991 | Cech et al. .................... 435/91 |
| 5,034,323 | A | | 7/1991 | Jorgensen et al. ......... 435/172.3 |
| 5,037,746 | A | | 8/1991 | Cech et al. .................... 435/91 |
| 5,107,065 | A | | 4/1992 | Shewmaker et al. ......... 800/205 |
| 5,116,742 | A | | 5/1992 | Cech et al. .................... 435/91 |
| 5,231,020 | A | | 7/1993 | Jorgensen et al. ......... 435/172.3 |
| 5,283,184 | A | | 2/1994 | Jorgensen et al. ......... 435/172.3 |
| 5,354,855 | A | | 10/1994 | Cech et al. ................. 536/24.1 |
| 5,453,566 | A | | 9/1995 | Shewmaker et al. ......... 800/205 |
| 5,501,967 | A | | 3/1996 | Offringa et al. ........... 435/172.3 |
| 6,307,127 | B1 | | 10/2001 | Jorsboe et al. ............... 800/294 |
| 6,372,477 | B1 | | 4/2002 | Jorsboe et al. ............... 435/233 |
| 6,488,091 | B1 | | 12/2002 | Weaver et al. ................ 166/300 |
| 6,706,951 | B1 | | 3/2004 | Dhugga et al. ............... 800/298 |
| 2004/0143871 | A1 | | 7/2004 | Dhugga ....................... 800/284 |
| 2009/0075845 | A1 | * | 3/2009 | Abad et al. .................. 507/117 |

FOREIGN PATENT DOCUMENTS

| EP | 1 091 086 A1 | 4/2001 |
| WO | WO 98/54335 | 12/1998 |
| WO | WO 99/52991 | 10/1999 |
| WO | WO 2004/046197 A2 | 6/2004 |
| WO | WO 2004/046197 A3 | 6/2004 |
| WO | WO 2006/120374 | 11/2006 |

OTHER PUBLICATIONS

Clough, Steven J., et al, Floral dip: a simplified method for Agrobacterium-mediated transformation of *Arabidopsis thaliana*, 1998, *The Plant Journal*, 16(6), 735-743.
Desfeux, Christine, et al, Female Reproductive Tissues Are the Primary Target of Agrobacterium-Mediated Transformation by the *Arabidopsis* Floral-Dip Method, 2000, American Society of Plant Physiologists, *Plant Physiology*, Jul. 2000, vol. 123, pp. 895-904.
Dhugga, Kanwarpal S., et al, Guar Seed β-Mannan Synthase Is a Member of the Cellulose Synthase Super Gene Family, 2004, *Science*, vol. 303, Jan. 16, pp. 363-366.
Edwards, Mary E., et al, Molecular characterisation of a membrane-bound galactosyltransferase of plant cell wall matrix polysaccharide biosynthesis, 1999, Blackwell Science Ltd, *The Plant Journal*, (1999) 19(6), 691-697.
Edwards, Mary E., et al, The Seeds of *Lotus japonicus* Lines Transformed with Sense, Antisense, and Sense/Antisense Galactomannan Galactosyltransferase Constructs Have Structurally Altered Galactomannans in Their Endosperm Cell Walls, 2004 American Society of Plant Biologists, *Plant Physiology*, Mar. 2004, vol. 134, pp. 1153-1162.
Joersbo, Morten, et al, In vivo modification of the cell wall polysaccharide galactomannan of guar transformed with a α-galactosidase gene cloned from senna, 2001 Kluwer Academic Publishers, The Netherlands, *Molecular Breeding* 7: 211-219, 2001.
Joersbo, Morten, et al, Isolation and expression of two cDNA clones encoding UDP-galactose epimerase expressed in developing seeds of the endospermous legume guar, 1999 Elsevier Science Ireland Ltd, *Plant Science* 142 (1999) 147-154.
Joersbo, Morten, et al, Transformation of the endospermous legume guar (*Cyamopsis tetragonoloba* L.) and analysis of transgene transmission, 1999 Kluwer Academic Publishers, The Netherlands, *Molecular Breeding* 5: 521-529, 1999.
Keegstra, Kenneth, et al, Plant glycosyltransferases, 2001, Elsevier Science Ltd, *Current Opinion in Plant Biology* 2001, 4: 219-224.
McCallum, Claire M., et al, *Targeting Induced Local Lesions IN Genomes (TILLING) for Plant Functional Genomics*, Scientific Correspondence, 2000, American Society of Plant Physiologists, *Plant Physiology*, Jun. 2000, vol. 123, pp. 439-442.
Reid, J. S. Grant, et al, Tobacco Transgenic Lines That Express Fenugreek Galactomannan Galactosyltransferase Constitutively Have Structually Altered Galactomannans in Their Seed Endosperm Cell Walls, 2003 American Society of Plant Biologists, *Plant Physiology*, Mar. 2003, vol. 131, pp. 1487-1495.
Somers, David A., et al, Recent Advances in Legume Transformation, Update on Transformation, 2003, American Society of Plant Biologists, *Plant Physiology*, Mar. 2003, vol. 131, pp. 892-899.
Topfer, Reinhard, et al, Uptake and Transient Expression of Chimeric Genes in Seed-Derived Embryos, 1989 American Society of Plant Physiologists, *The Plant Cell*, vol. 1, 133-139, Jan. 1989.
Foreign commucation related to a counter part dated Jul. 6, 2006.

* cited by examiner

*Primary Examiner*—Timothy J. Kugel
(74) *Attorney, Agent, or Firm*—Robert A. Kent; Baker Botts L.L.P.

(57) ABSTRACT

Methods comprising: providing a treatment fluid comprising: an aqueous base fluid and a gelling agent that comprises a nonnatural galactomannan; and placing the treatment fluid into the subterranean formation. Treatment fluids suitable for use in a subterranean treatment operation comprising an aqueous base fluid and a gelling agent that comprises a nonnatural galactomannan.

19 Claims, No Drawings

NONNATURAL GALACTOMANNANS AND METHODS OF USE

BACKGROUND

The present invention relates to methods and compositions for treating subterranean formations. More particularly, the present invention relates to treatment fluids that comprise a nonnatural galactomannan and to methods of using such treatment fluids in subterranean treatments. The "nonnatural galactomannans" used in the treatment fluids of the present invention are galactomannans that have been isolated from at least part of a genetically modified plant.

Treatment fluids may be used in a variety of subterranean treatments, including, but not limited to, drilling operations, stimulation treatments, and sand control treatments. Drilling operations typically require the use of a drilling fluid. Drilling fluids typically require sufficient viscosity to suspend drill cuttings. One common production stimulation operation that employs a treatment fluid is hydraulic fracturing. Hydraulic fracturing operations generally involve pumping a treatment fluid (e.g., a fracturing fluid) that usually includes proppant particulates into a well bore that penetrates a subterranean formation at a sufficient hydraulic pressure to create or enhance one or more cracks or "fractures" in the subterranean formation. An example of a sand control operation is gravel packing. In gravel packing treatments, a treatment fluid carries particulates (commonly referred to as "gravel particulates") to a desired area in a well bore, for example, near unconsolidated or weakly consolidated formation zones, to form a gravel pack neighboring that portion of the formation. In some situations, fracturing and gravel packing treatments are combined into a single treatment (commonly referred to as "frac-pack" operations).

Maintaining sufficient viscosity in these and other applications using treatment fluids is important for a number of reasons. One reason is to transport formation solids, such as drill cuttings, more readily. Another reason is to maintain desirable particulate transport characteristics. Additionally, maintaining sufficient viscosity may be important to control leak-off into the formation. To provide the desired viscosity, viscosifying polymers or "gelling agents" commonly are included in treatment fluids. Examples of commonly used polymeric gelling agents include, but are not limited to, guar gums, cellulose derivatives, and biopolymers.

Guar gum is an economical thickener and stabilizer extracted from the seed of the leguminous guar shrub, known as *Cyamopsis tetragonoloba*. Almost all the guar gum currently used in subterranean hydrocarbon recovery operations is imported from overseas. World events and fluctuations in crop yield can impact price structures for this vital component of the petroleum industry.

Guar gum is primarily composed of galactomannans. Galactomannans serve as storage carbohydrates that accumulate in the endosperm of seeds from which guar gum is derived. Galactomannans also accumulate in the endosperms of other leguminous plants, for example, locust bean (*Ceratonia siliqua*) and coconut palm (*Cocus nucifera*).

Galactomannans are formed from a linear (1→4)-β-linked mannan backbone with varying degrees of substitution with single-unit galactosyl side chains attached by (1→6)-α linkages. The production of galactomannans in plants is primarily dependent on the activity of two enzymes: mannan synthase, which makes β-1,4-linked mannan backbone, and α-galactosyltransferase, which adds galactosyl residues to the mannan backbone.

SUMMARY

The present invention relates to methods and compositions for treating subterranean formations. More particularly, the present invention relates to treatment fluids that comprise a nonnatural galactomannan and to methods of using such treatment fluids in subterranean treatments.

In one embodiment, the present invention provides methods comprising: providing a treatment fluid comprising: an aqueous base fluid and a gelling agent that comprises a nonnatural galactomannan; and placing the treatment fluid into a subterranean formation.

In another embodiment, the present invention provides treatment fluids suitable for use in a subterranean treatment operation comprising an aqueous base fluid and a gelling agent that comprises a nonnatural galactomannan.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to methods and compositions for treating subterranean formations. More particularly, the present invention relates to treatment fluids that comprise a nonnatural galactomannan and to methods of using such treatment fluids in subterranean treatments. The methods and compositions of the present invention are useful in a variety of applications in which it is desirable to increase the viscosity of a fluid. Examples include, but are not limited to, treatment fluids used in subterranean applications, such as drilling fluids, fracturing fluids, and gravel packing fluids.

The treatment fluids of the present invention generally comprise a nonnatural galactomannan and an aqueous base fluid. Additionally, other additives suitable for use in a particular application may be included in the treatment fluids of the present invention as recognized by one of ordinary skill in the art having the benefit of this disclosure. Some examples of such additives may include acids, bases, buffers, fluid loss control agents, weighting agents, surfactants, scale inhibitors, clay stabilizers, silicate-control agents, gases, antifoaming agents, flow assurance chemicals, foaming agents, storage stabilizers, biocides, biostatic agents, and storage stabilizers. The particular application in which a treatment fluid of this invention will be used may dictate the appropriate additives to include.

I. The Nonnatural Galactomannans Suitable for Use in the Present Invention.

The nonnatural galactomannans used in the treatment fluids of the present invention are galactomannans that have been isolated from at least part of a genetically modified plant.

Generally speaking, a nonnatural galactomannan may have a structure that is altered in comparison to naturally occurring galactomannans. Examples of a structure that may be altered in a nonnatural galactomannan include, but are not limited to, modifications in the subunits, polymer backbone, or substitution of groups or patterns of groups. For example, nonnatural galactomannans may differ from natural galactomannans in that they may have a different molecular weight or a different mannose to galactose ("M:G") ratio or both. Nonnatural galactomannans also may differ from natural galactomannans in that they may comprise sugars other than or in addition to mannose and galactose.

The altered structure of some nonnatural galactomannans may dictate their specific properties. For example, the M:G ratio may affect properties such as solubility, dispersability, crosslinking efficiency, viscosity, and hydration rates. Another example is molecular weight. Additionally, nonnatural galactomannans with higher molecular weights generally are capable of viscosifying fluids to the same extent as other galactomannans but at lower concentrations.

Galactomannans derived from the guar plant (e.g., natural galactomannans) typically have an average molecular weight of about 2 million Daltons and an M:G ratio in the range of from about 1.6:1 to about 1.8:1. A nonnatural galactomannan may have an average molecular weight less than or greater than about 2 million Daltons. These nonnatural galactomannans also may have an M:G ratio less than about 1.6:1 or an M:G ratio greater than about 1.8:1. The specific molecular weight and M:G ratio for a nonnatural galactomannan will depend on, among other things, the transgenic plant in which the nonnatural galactomannan is formed.

II. Methods of Producing Nonnatural Galactomannans Suitable for Use in the Present Invention.

Nonnatural galactomannans may be formed by altering the normal galactomannan biosynthetic pathway in a plant, for example, by ectopically expressing a galactomannan biosynthetic enzyme or expressing a modified galactomannan biosynthetic enzyme, inactivating a galactomannan biosynthetic enzyme, or up- or down-regulating expression of a galactomannan biosynthetic enzyme.

A. Galactomannan Biosynthetic Enzymes.

Galactomannan biosynthetic enzymes are enzymes involved with the formation of a galactomannan or a galactomannan precursor. Galactomannan biosynthetic enzymes also include enzymes that may affect the structure of a galactomannan as it is formed or degraded. Suitable galactomannan biosynthetic enzymes include those that encode proteins that are needed to catalyze the formation of galactomannan or any galactomannan precursor. Examples of galactomannan biosynthetic enzymes include, but are not limited to, mannan synthase, galactomannan galactosyltransferase, galactose epimerase, α-galactosidases, and GDP-mannose pyrophosphorylase. Other suitable galactomannan biosynthetic enzymes may be identified using methods known in the art; for example, by constructing cDNA libraries and analyzing expressed sequence tags ("EST") databases or by using techniques such as targeting induced local lesions in genomes ("TILLING") or transposon mobilization.

The primary galactomannan biosynthetic enzymes are two glycosyltransferases: a GDP-mannose (and $Mg^{+2}$)-dependent $(1\rightarrow 4)$-$\beta$-$_D$-mannosyltransferase or "mannan synthase" and a UDP-galactose (and $Mn^{+2}$)-dependent mannan specific $(1\rightarrow 6)$-$\alpha$-$_D$-galactosyltransferase or "galactomannan galactosyltransferase." Mannan synthase adds mannose ("Man") residues to the mannan backbone of a galactomannan. Galactomannan galactosyltransferase transfers galactose ("Gal") residues to an acceptor Man residue of the mannan backbone. Together, these enzymes catalyze the formation of galactomannans, and the transfer properties of the galactomannan galactosyltransferase are important in determining the M:G ratio of the resulting galactomannan molecule. Accordingly, altering the expression of mannan synthase or galactomannan galatosyltransferase or both may allow the formation of a nonnatural galactomannan.

Galactose epimerase (UDP-galactose-4'-epimerase) catalyzes the interconversion of UDP-$_D$-galactose and UDP-$_D$-glucose. Galactose epimerase produces the precursor UDP-$_D$-galactose, which can be incorporated into a galactomannan. In vitro, the relative concentrations of the galactomannan precursors UDP-$_D$-mannose and UDP-$_D$-galactose may affect the ratio of Man and Gal incorporated into a galactomannan molecule. Altering the amount of galactose epimerase expressed may allow the formation of a nonnatural galactomannan.

Many plant species, including legumes, contain α-galactosidases. α-galactosidase is capable of removing Gal side-chains from galactomannans; and when α-galactosidase genes are expressed in transgenic plants, the resulting galactomannans have a reduced Gal content. Accordingly, altering α-galactosidase levels also may be suitable to form nonnatural galactomannans.

B. Methods of Forming Nonnatural Galactomannans by Ectopically Expressing a Galactomannan Biosynthetic Enzyme.

One example of a method for forming a nonnatural galactomannan is to ectopically express a galactomannan biosynthetic enzyme or fragment thereof or modified form thereof. The term "ectopically," as used in reference to expression of galactomannan biosynthetic enzymes and fragments, refers to an expression pattern that is distinct from the expression pattern in a wild-type plant (e.g., in a cell type other than a cell type in which the nucleic acid molecule normally is expressed, or at a time other than a time at which the nucleic acid molecule normally is expressed, or at a level other than the level at which the nucleic acid molecule normally is expressed). The term "fragment(s)" refers to a portion of a galactomannan biosynthetic enzyme or a portion of the nucleic acid sequence encoding the portion of the galactomannan biosynthetic enzyme.

In one embodiment, a nonnatural galactomannan may be formed by ectopically expressing one or more galactomannan biosynthetic enzymes, or fragments thereof, in a plant by a method that comprises the following steps: forming at least one expression cassette, transforming a plant cell with the expression cassette, expressing at least one nucleic acid sequence from the expression cassette, forming a nonnatural galactomannan, and, if desired, regenerating the transgenic plant.

1. Expression Cassettes.

The expression cassette generally comprises at least one galactomannan nucleic acid sequence. In the context of the present invention, the term "galactomannan nucleic acid sequence" refers to a nucleic acid sequence that encodes at least part of an enzyme involved with the synthesis or degradation of a galactomannan, or that regulates an enzyme involved with the synthesis or degradation of a galactomannan. Such galactomannan nucleic acid sequences include sequences in the sense and antisense orientation, such as RNAi. The expression cassette also may comprise other nucleic acid sequences, such as a promoter, a selectable marker, and the like.

In some embodiments, in which the expression cassette comprises a promoter, the galactomannan nucleic acid may encode a protein or a protein fragment of at least one galactomannan biosynthetic enzyme, wherein the nucleic acid sequence is operably linked to the 3' end of the promoter in sense orientation. In some embodiments, the expression cassette may be modified in such a way that the at least one nucleic acid sequence is operably linked to the 3' end of the promoter in antisense orientation.

In some embodiments, the galactomannan nucleic acid sequences may be introduced into a plant as a self-replicating system.

a. Galactomannan Nucleic Acid Sequences.

As discussed above, the galactomannan nucleic acid sequence may comprise a nucleotide sequence that encodes a galactomannan biosynthetic enzyme or fragment thereof. The galactomannan nucleic acid sequence also may comprise a nucleic acid sequence that regulates a galactomannan biosynthetic enzyme. The type of nonnatural galactomannan formed by a certain expression cassette will depend, at least in part, on the galactomannan nucleic acid sequence chosen. For example, expression cassettes that comprise galactomannan nucleic acid sequence that code for a galactomannan biosynthetic enzyme, such as mannan synthase or GDP-mannose pyrophosphorylase or both, may form a nonnatural galactomannan that has a greater molecular weight as compared to a wild-type galactomannan. Nonnatural galactomannans having a lower M:G ratio may be formed using expression cassettes that comprise one or more galactomannan nucleic acid sequences that encode a galactomannan galactosyltransferase or a galactose epimerase or both. Nonnatural galactomannans having a higher M:G ratio may be formed using expression cassettes that comprise one or more galactomannan nucleic acid sequences that encode a mannan synthase or α-galactosidease or both.

b. Other Nucleic Acid Sequences

In addition to galactomannan nucleic acid sequences, other nucleic acid sequences also may be included in the expression cassette. Such sequences include, but are not limited to, promoters, polylinkers and restriction enzyme sites, transcription terminators, a poly(A)-tail to the respective transcript, and extraneous sequences to enhance expression such as introns and 5' leader sequences.

A variety of transcription terminators may be used which are responsible for termination of transcription beyond a coding region and correct polyadenylation. Appropriate transcription terminators include those that are known to function in plants such as, for example, the CaMV 35S terminator, the tml terminator, the octopine synthase terminator, the nopaline synthase terminator, and the pea rbcS E9 terminator.

Numerous sequences known in the art have been found to enhance gene expression from within the transcriptional unit, and these sequences also may be used in conjunction with the expression cassette to increase expression of the nucleic acid sequences in plant cells. For example, various intron sequences have been shown to enhance expression. In addition, a number of non-translated leader sequences derived from viruses are also known to enhance expression, and these are particularly effective in dicotyledonous cells. Such nucleic acid sequences may be included in an expression cassette.

c. Promoters

Any suitable promoter functional in the plant of choice can be used. The promoter may be selected based on the desired outcome. The nucleic acid sequence can be combined with a constitutive promoter, a tissue-preferred promoter (e.g., a seed-specific promoter), an inducible promoter (e.g., pathogen- and wound-inducible promoters), a chemical-regulated promoter, or another promoter for expression in plants. Selection of a suitable promoter may include several considerations, for example, recipient cell type (such as, for example, endosperm cells, leaf epidermal cells, mesophyll cells, root cortex cells), tissue- or organ-specific expression of nucleic acid sequences linked to the promoter, and timing and level of expression (as may be influenced by constitutive versus regulatable promoters and promoter strength). Promoters for use in regulating transcription of nucleic acid sequences in cells, particularly plant cells, include, but are not limited to, a wheat high-molecular-weight glutenin promoter (45T), a USP promoter, the hordein promoter, the napine promoter, the nopaline synthase (NOS) and octopine synthase (OCS) promoters, cauliflower mosaic virus (CaMV) 19S and 35S promoters, the light-inducible promoter from the small subunit of ribulose bis-phosphate carboxylase (ssRUBISCO, an abundant plant polypeptide), the mannopine synthase (MAS) promoter, the rice actin promoter, *Arabidopsis thaliana* UBI 3 promoter, and the chemically inducible PR-1 promoter from tobacco or *Arabidopsis*. Heterologous gene expression systems also may be used, such as the yeast transcription activator GAL4 and its respective upstream activation sequence.

In view of the large amounts of galactomannans formed in the seed of many plants, promoters that provide seed-specific expression may be useful in this respect. Examples of known seed-specific promoters include, but are not limited to, bean β-phaseolin, napin, β-conglycinin, soybean lectin, and cruciferin. In case such promoters are not already known or not yet available, the strategy and methods for the isolation of such promoters are known to artisans of ordinary skill. In general, in a first step poly(A)$^+$ RNA is isolated from seed tissue and a cDNA library is established. In a second step, with the help of cDNA clones based on poly(A)$^+$ RNA molecules originating from a non-seed tissue, those clones are identified by hybridization from the first library, whose corresponding poly(A)$^+$ RNA molecules are expressed only in seed tissue. Subsequently, promoters are isolated with the help of cDNAs identified in this manner. Likewise, other tissue-specific or developmental specific promoters, or promoters that can be induced by abiotic stimuli, may be isolated and used according to the invention.

When low level expression is desired, weak promoters can be used. A weak promoter drives expression of a coding sequence at a low level, but also encompasses promoters that are expressed in only a few cells and not in others to give a total low level of expression.

The promoter should be operably linked to at least one galactomannan nucleic acid sequence that codes for a protein or a protein fragment of at least one galactomannan biosynthetic enzyme. Examples of suitable galactomannan biosynthetic enzymes include, but are not limited to, a mannan synthase, a galactomannan galactosyltransferase, a galactose epimerase, an α-galactosidase, and GDP-mannose pyrophosphorylase.

d. Selectable Markers.

A selectable marker also may be included in the expression cassette, among other things, for the selection of transformed cells. The term, "selectable marker" refers to a composition that can be used to distinguish one cell from another cell. For example, a selectable marker may be a nucleic acid encoding a readily detected protein that has been introduced into some cells but not others. Detection of the expressed protein in cells facilitates identification of cells containing the marker nucleic acid by distinguishing them from cells that do not contain the marker nucleic acid. Thus, for example, a selectable marker may be a fluorescent protein, such as green fluorescent protein (GFP), or β-galactosidase (or a nucleic acid encoding either of these proteins). Selectable markers such as these, which are not required for cell survival or proliferation in the presence of a selection agent, also may be referred to as reporter molecules. Other selectable markers, for example, the neomycin phosphotransferase gene, provide for isolation and identification of cells containing them by conferring properties on the cells that make them resistant to an agent, for example, a drug such as an antibiotic that inhibits proliferation of cells that do not contain the marker.

Of particular interest for purposes of forming nonnatural galactomannans are nucleic acid selectable markers that, upon expression in the host cell, confer antibiotic or herbicide resistance to the cell, sufficient to provide for the maintenance of heterologous nucleic acids in the cell. Examples of such markers include DNA encoding products that confer cellular resistance to hygromycin, kanamycin, G418, bialaphos, Basta, methotrexate, glyphosate, and puromycin. For example, neo (or nptII) provides kanamycin resistance and can be selected for using kanamycin, G418, paromomycin, and other agents; bar from *Steptomyces hygroscopius*, which encodes the enzyme phosphinothricin acetyl transferase (PAT) confers resistance to bialaphos, glufosinate, Basta, and phosphinothricin; the hph gene which confers resistance to the antibiotic hygromycin; a mutant EPSP synthase protein confers glyphosate resistance; and a nitrilase such as bxn from *Klebsiella ozaenae* confers resistance to bromoxynil. DNA encoding cystathionine gamma-synthase (CGS) can be used as a marker that confers resistance to ethionine.

Nucleic acids encoding reporter molecules also may be included in the expression cassette. Such reporters provide a means for identifying cells and chromosomes into which heterologous nucleic acids have been transferred and further provide a means for assessing whether or not, and to what extent, transferred DNA is expressed.

Nucleic acids encoding reporter molecules that may be used in monitoring transfer and expression of heterologous nucleic acids into cells include, but are not limited to, nucleic acid encoding β-glucuronidase (GUS) or the uidA gene product, which is an enzyme for which various chromogenic substrates are known and commercially available (e.g., those from Clontech Laboratories, Palo Alto, Calif.); DNA from an R-locus gene, which encodes a product that regulates the production of anthocyanin pigments (red color) in plant tissues; nucleic acid encoding β-lactamase, which is an enzyme for which various chromogenic substrates are known (e.g., PADAC, a chromogenic cephalosporin); DNA from a xy/E gene, which encodes a catechol dioxygenase that can convert chromogenic catechols; nucleic acid encoding α-amylase, nucleic acid encoding tyrosinase, an enzyme capable of oxidizing tyrosine to dihydroxyphenylalanine (DOPA) and dopaquinone that in turn condenses to form the readily detectable compound melanin; nucleic acid encoding β-galactosidase, an enzyme for which there are chromogenic substrates; nucleic acid encoding luciferase (lux), which allows for bioluminesence detection; nucleic acid encoding aequorin, which may be employed in calcium-sensitive bioluminescence detection; nucleic acid encoding a green fluorescent protein (GFP); nucleic acid encoding a red or blue fluorescent protein (RFP or BFP, respectively); or nucleic acid encoding chloramphenicol acetyltransferase (CAT).

Generally, the selectable marker chosen should not be overly phytotoxic. When the selectable marker is phytotoxic, however, a potentiator may be used so that the selectable marker can be used in lower concentrations. A potentiator is a compound that may lead to an increased frequency of regenerated and transformed shoots when included in a selection media or shoot growth media. The potentiators may function either by eliminating or reducing the amount of the respective compounds (e.g., by inhibiting biosynthesis of the compounds or by degrading the compounds) or by inhibiting the action of the compounds. Such potentiators may be particularly useful when transforming plants of the genus *Cyamopsis*. Examples of suitable potentiators and methods of using them are described in U.S. Pat. No. 6,307,127, which is incorporated herein by reference, and include, but are not limited to, auxin inhibitors, β-lactamase inhibitors, and ethylene inhibitors.

e. Vectors.

The expression cassettes used may be formed in any suitable cloning vector. Generally, such vectors comprise an origin of replication active in *Escherichia coli* and a selectable marker for the selection of transformed bacteria cells. Examples of such vectors include, but are not limited to, pBR322, pUC series, M13 mp series, pACYC184, pBI121, and derivatives thereof. The desired sequence can be inserted into the vector at a suitable restriction site. The plasmid obtained is used for the transformation of *E. coli* cells. Transformed *E. coli* cells are cultured in a suitable medium and subsequently harvested and lysed. The plasmid is recovered. Usually, restriction mapping, gel electrophoresis, and other biochemical, molecular biological methods are applied as analyzing methods to characterize the recovered plasmid DNA, as is known in the art. After each manipulation, the plasmid DNA can be digested and the obtained DNA fragments can be linked with other DNA sequences. Each plasmid DNA sequence can be cloned in the same or other plasmids.

If *Agrobacteria* are used to introduce an expression cassette into a plant cell, the expression cassette or vector carrying the expression cassette should comprise elements necessary for such transformation, for example, T-DNA sequences. Accordingly, expression cassettes may be formed in or cloned into a suitable Ti or Ri plasmid carried by *A. tumefaciens* or *A. rhizogenes*, as more fully described below.

2. Transformation of a Plant Cell with an Expression Cassette.

Once formed, the expression cassette may be introduced into a plant cell by transformation. The term "transformation" refers to the introduction of foreign DNA into cells. Transformed DNA may integrate into the genome of the plant and may be inherited by the plant's progeny. Alternatively, transformed DNA may enter the cell of a plant but not integrate into the plant's chromosome.

The plant cell to be transformed may be from any plant. In certain embodiments, the plant cell is a cell from a plant of the family Fabaceae. Members of this family include *Cyamopsis tetragonoloba, Trigonella foenum-graecum, Senna occidentalis,* and *Ceratonia siliqua*. The plant cell may be cells in culture, cells present as a disorganized mass in a callus, cells organized as leaf explants, shoot cultures, seeds, fruits, leaves, roots, or cells organized as a whole plant depending on, among other things, the particular transformation method chosen.

Many well known transformation methods are available, and the skilled person can determine and select suitable procedures based on, for example, the type of plant or plant cell to be transformed. Suitable transformation methods generally include direct DNA uptake (e.g., PEG, lipids, electroporation), mechanical methods (e.g., microinjection or silicon "whiskers"), viral DNA and RNA methods, and *Agrobacterium*-mediated transformation methods. In addition, the expression cassette may be introduced into a desired plant variety by crossing.

a. Direct DNA Uptake Methods of Transformation.

Certain transformation methods known in the art facilitate direct DNA uptake, including calcium phosphate precipitation, polyethylene glycol (PEG) treatment, electroporation, and combinations thereof. When using direct DNA uptake methods, no specific demands per se are made on the plasmids used. Here, simple plasmids, such as pUC-derivatives, can often be used. If however, whole intact plants are to be regenerated from cells transformed in this way, the presence of a selectable marker gene is usually required. The skilled person is familiar with customary selection markers, and can easily select an appropriate marker.

Nucleic acids also may be introduced into plant cells using electroporation, the application of brief, high-voltage electric pulses to a cell. Electroporation leads to the formation of nanometer-sized pores in the plasma membrane. Nucleic acids are taken directly into the cell cytoplasm either through these pores or as a consequence of the redistribution of membrane components that accompanies closure of the pores. Electroporation can be extremely efficient and can be used both for transient expression of transformed genes and for the establishment of cell lines that carry integrated copies of the transformed gene of interest.

Nucleic acids also may be introduced into plant cells using lipid-mediated transfer. In lipid-mediated transfer, nucleic acids are contacted with lipids or encapsulated in lipid-containing structures, including but not limited to liposomes, and the liposome-containing nucleic acids are fused with plant protoplasts. The fusion can occur in the presence or absence of a fusogen, such as PEG.

Nucleic acids may also be imbibed by hydrating plant tissue, providing another method for nucleic acid uptake into plant cells. For example, nucleic acids may be taken into cereal and legume seed embryos by inbibition, for example, as described by Töpfer et al., *The Plant Cell*, 1:133-139 (1989), the relevant disclosure of which is incorporated herein by reference.

b. Mechanical Methods of Transformation.

Microprojectile bombardment of plant cells can be an effective method for the introduction of nucleic acids into plant cells. In these methods, nucleic acids are carried through the cell wall and into the cytoplasm on the surface of small, typically metal, particles. Particles may be coated with nucleic acids and delivered into cells by a propelling force (e.g., by gas or electrical discharge). Exemplary particles include those containing tungsten, gold, or platinum, as well as magnesium sulfate crystals. The metal particles can penetrate through several layers of cells and thus allow the transformation of cells within tissue explants.

For the bombardment, cells in suspension may be concentrated on filters or solid culture medium. Alternatively, immature embryos or other target cells may be arranged on solid culture medium. The cells to be bombarded are typically positioned at an appropriate distance below a microprojectile stopping plate. If desired, one or more screens also may be positioned between the acceleration device and the cells to be bombarded. The screen disperses the particles so that they are not delivered to the recipient cells in large aggregates and may contribute to a higher frequency of transformation by reducing damage inflicted on the recipient cells by projectiles that are too large.

The prebombardment culturing conditions and bombardment parameters may be optimized to yield the maximum numbers of stable transformants. Both the physical and biological parameters for bombardment can be important in this regard. Physical factors include those that involve manipulating the DNA/microprojectile precipitate or those that affect the flight and velocity of either the macro- or microprojectiles. Biological factors include all steps involved in manipulation of cells before and immediately after bombardment, the osmotic adjustment of target cells to help alleviate the trauma associated with bombardment, and also the nature of the transforming nucleic acid, such as linearized DNA or intact supercoiled plasmids. Physical parameters that may be adjusted include gap distance, flight distance, and tissue distance. In addition, transformation may be optimized by adjusting the osmotic state, tissue hydration, and subculture stage or cell cycle of the recipient cells.

Nucleic acids also may be introduced into plant cells using microinjection. In microinjection techniques, nucleic acids are mechanically injected directly into cells using very small micropipettes.

Other methods to physically introduce nucleic acid into plant cells may be used, including silicon carbide fibers ("whiskers") that are used to pierce plant cell walls thereby facilitating nucleic acid uptake, the use of sound waves to introduce holes in plant cell membranes to facilitate nucleic acid uptake (e.g., sonoporation), and the use of laser beams to open holes in cell membranes facilitating the entry of nucleic acids (e.g., laser poration).

c. *Agrobacterium*-Mediated Transformation.

The expression cassette also may be transformed into a plant cell by infection with an Agrobaterium strain containing the expression cassette for random integration (see, e.g., U.S. Pat. No. 4,940,838, incorporated herein by reference) or targeted integration (see, e.g., U.S. Pat. No. 5,501,967, incorporated herein by reference). When *Agrobacteria* are used for transformation, the heterologous nucleic acid being transferred generally is cloned into a plasmid that contains T-DNA border regions and is replicated independently of the Ti plasmid (referred to as the binary vector system) or the heterologous nucleic acid is inserted between the T-DNA borders of the Ti plasmid (referred to as the cointegrate method).

Many vectors are available for transfer of nucleic acids into *Agrobacteria*. A particularly useful Ti plasmid vector for the transformation of dicotyledonous plants contains the enhanced CaMV35S promoter (EN35S) and the 3' end, including polyadenylation signals, of a soybean gene encoding a subunit of β-conglycinin. Between these two elements is a polylinker containing multiple restriction sites for the insertion of an expression cassette. The vector can contain a segment of pBR322 which provides an origin of replication in *E. coli* and a region for homologous recombination with the disarmed T-DNA in *A. tumefaciens* strain ACO or *Agrobacterium* strain GV3101/pMP90; the oriV region from the broad host range plasmid RK1; the streptomycin/spectinomycin resistance gene from Tn7; and a chimeric NPTII gene, containing the CaMV35S promoter and the nopaline synthase (NOS) 3' end, which provides kanamycin resistance in transformed plant cells. Optionally, the enhanced CaMV35S promoter may be replaced with the mannopine synthase (MAS) promoter. After incorporation of an expression cassette into the vector, it is introduced into *A. tumefaciens* strain ACO which contains a disarmed Ti plasmid. Cointegrate Ti plasmid vectors are selected and subsequently may be used to transform a dicotyledenous plant.

Strains of *Agrobacteria* that are useful for Ti-plasmid vector based plant transformation are defined by their chromosomal background and resident Ti plasmid. Significant modifications to the virulence of certain *Agrobacteria* have expanded the range of plant species that are susceptible to T-DNA transformation by improving the frequency of T-DNA transfer. Although any of the numerous strains of *A. tumefaciens* capable of transferring genetic material to Fabaceae species can be used, particularly improved transformation, recovery, and regeneration can be achieved by using *A. tumefaciens* strains LBA4404, as well as other strains sharing common characteristics with these strains (e.g., ABI 17204, ASE 9749, C58, and EHA 101).

Transformation of the target plant species by recombinant *Agrobacterium* usually involves cocultivation of the *Agrobacterium* with explants from the plant and follows published protocols. One example of a suitable *Agrobacterium*-based transformation method is described in M. Joersbo, et al., *Molecular Breeding*, 5:521-29 (2001) and U.S. Pat. No. 6,307,127, each of which is incorporated herein by reference. Other examples include inoculation of protoplast, callus, or organ tissue with *Agrobacterium*, the leaf disc procedure, and the floral dipping procedure.

Any available means may be employed to identify or characterize transformed cells. Often, as is known in the art, transformed cells are selected by growth on a selective medium. Transgenicity also may be analyzed, for example, using the histological GUS assay.

3. Regeneration of a Transgenic Plant.

Because transformation of a plant occurs at a cellular level, it may be necessary to regenerate the cell. Accordingly, transformed plant cells may be used to regenerate plants. The regeneration of plants may be carried out according to customary regeneration methods by using conventional nutrient media. Plants obtained in the above-described manner can then be examined for the presence of the introduced DNA or phenotypic properties, using methods known in the art.

In order to obtain true-breeding transformed plants, it is common practice to self-cross the transformed plants, and to identify non-segregating, homozygous transgenic offspring. Such inbred plants produce seeds transformed with the sequence or sequences of interest; such seeds can be germinated or grown as desired.

C. Methods of Forming Nonnatural Galactomannans by Inactivating Galactomannan Biosynthetic Enzymes.

Nonnatural galactomannans also may be formed by inactivating one or more galactomannan biosynthetic enzymes in a plant. The term "inactivating," in reference to galactomannan biosynthetic enzyme expression, means that the amount of functional galactomannan biosynthetic gene product is reduced in a plant in comparison with the amount of functional galactomannan biosynthetic gene product in the corresponding wild-type plant. Inactivation of a galactomannan biosynthetic enzyme may be accomplished by deleting a portion of the corresponding gene or by replacing a portion of the corresponding gene with a second sequence, but also may be caused by other modifications to the gene such as the introduction of stop codons, the mutation of critical amino acids, the insertion or removal of an intron junction, and the like. Expression also may be inactivated using transposons or T-DNA sequences. Galactomannan biosynthetic mutants prepared by these methods are identified according to standard techniques. For instance, mutants can be detected by PCR or by detecting the presence or absence of mRNA, e.g., by Northern blots. Mutants also can be selected by assaying for the affected galactomannan biosynthetic enzyme or gene product.

Any galactomannan biosynthetic enzyme may be inactivated. The type of nonnatural galactomannan formed will depend, at least in part, on the galactomannan biosynthetic enzyme chosen or combination of galactomannan biosynthetic enzymes chosen. For example, when a mannan synthase gene is inactivated, nonnatural galactomannans having a lower molecular weight as compared to a wild-type galactomannan may be formed. Nonnatural galactomannans with higher M:G ratio may be formed by inactivating galactomannan galactosyltransferase or galactose epimerase or both. While nonnatural galactomannans with a lower M:G ratio may be formed by inactivating α-galactosidease.

Methods for introducing genetic mutations into plant genes are well known. For instance, seeds or other plant material can be treated with a mutagenic chemical substance, according to standard techniques. Such chemical substances include, but are not limited to, the following: diethyl sulfate, ethylene imine, ethyl methanesulfonate, and N-nitroso-N-ethylurea. Alternatively, ionizing radiation from sources such as, for example, X-rays or gamma rays can be used.

Galactomannan biosynthetic enzymes may be inactivated by introducing one or more point mutations into a coding region of the corresponding gene, for example, by site-directed mutagenesis. Such mutagenesis can be used to introduce a specific, desired amino acid insertion, deletion, or substitution; alternatively, a nucleic acid sequence can be synthesized having random nucleotides at one or more predetermined positions to generate random amino acid substitutions. Such methods are known and routinely practiced in the art.

Galactomannan biosynthetic enzymes also may be inactivated using transposon-mediated insertional mutagenesis. Such methods use transposable elements such as Ds, Ac, or MU, which are inserted into a gene to cause mutations. Insertion of a transposon into a galactomannan biosynthetic gene can be identified, for example, by restriction mapping, which can identify the presence of ari insertion in the gene promoter or in the coding region, such that expression of functional gene product is prevented. Insertion of a transposon also can be identified by detecting an absence of the mRNA encoded by the target gene or by the detecting the absence of the gene product. Galactomannan biosynthetic genes also may be inactivated by producing a loss-of-function mutation using T-DNA-mediated insertional mutagenesis.

Once an inactivated galactomannan biosynthetic enzyme construct is formed, it may be introduced into a plant using homologous recombination. In this way, homologous recombination can be used to induce targeted gene disruptions by specifically deleting or altering a galactomannan biosynthetic gene in vivo. Homologous recombination involves the introduction of extrachromosomal DNA with homology to endogenous sequence. Insertion of the extrachromosomal DNA occurs as a result of crossing over during mitotic division.

Accordingly, mutations in selected portions of a galactomannan biosynthetic gene (including 5' upstream, 3' downstream, and intragenic regions) may be made in vitro and then introduced into the desired plant using, for example, the various transformation techniques described above. Since the efficiency of homologous recombination is known to be dependent on the vectors used, use of dicistronic gene targeting vectors may be used to increase the efficiency of selecting for altered galactomannan biosynthetic gene expression in transgenic plants. The mutated gene will interact with the target wild-type gene in such a way that homologous recombination and targeted replacement of the wild-type gene may occur in transgenic plant cells, resulting in inactivation of the galactomannan biosynthetic enzyme's activity.

It will also be readily appreciated by those skilled in the art that a wide variety of methods are known for forming transgene constructs that silence or inactivate an endogenous gene. Homologous recombination is but one of the methods known to those skilled in the art for rendering an endogenous gene inoperative. Gene targeting also can be used to silence or replace the endogenous gene with an engineered allele; thus the phenotype of the altered gene, or its regulatory sequences, can be evaluated in planta.

D. Methods of Forming Nonnatural Galactomannans by Down-Regulating Galactomannan Biosynthetic Enzymes.

Nonnatural galactomannan also may be formed by down-regulating the expression of one or more galactomannan biosynthetic enzymes in a plant. Nucleic acids that are designed to down-regulate plant-encoded genes may be introduced into plants. A number of different means to achieve down-regulation have been demonstrated in the art, including antisense RNA (including RNAi), ribozymes, and cosuppression. The use of antisense RNA to suppress plant genes is described, for example, in U.S. Pat. Nos. 4,801,540, 5,107,065, and 5,453,566, the relevant disclosures of each are incorporated herein by reference. In such methods, an "antisense" nucleotide sequences may be constructed that encode an RNA that is complementary to the messenger RNA (mRNA) of a galactomannan biosynthetic enzyme, such that expression of the antisense gene inhibits the translation of the mRNA of the resident plant gene. Thus, the activity of the resident gene is down-regulated.

An additional method of down regulating gene activities involves RNA enzymes (ribozymes). The use of ribozymes is described, for example, in U.S. Pat. Nos. 4,987,071, 5,037,746, 5,116,742, and 5,354,855, the relevant disclosures of each are incorporated herein by reference. These methods rely on the expression of small catalytic RNA molecules that are capable of binding to and cleaving specific RNA sequences. Ribozymes designed to specifically recognize a galactomannan biosynthetic enzyme's mRNA can be used to cleave the mRNA and prevent its proper expression.

Essentially a more or less equivalent down-regulation of gene activities by ribozymes and antisense can be achieved by adding additional copies of the gene to be regulated. The process is referred to as cosuppression and is described in, for example, U.S. Pat. Nos. 5,034,323, 5,283,184 and, 5,231,020, the relevant disclosures of each are incorporated herein by reference. Often, the expression of the sense transcript of a native gene will reduce or eliminate expression of the native gene in a manner similar to that observed for antisense genes. The introduced gene may encode all or part of the targeting native protein but its translation may not be required for reduction of levels of that native protein.

III. Treatment Fluids of the Present Invention Formed Using Nonnatural Galactomannans.

As discussed above, nonnatural galactomannans are particularly useful in treatment fluids. For example, higher molecular weight nonnatural galactomannans may be suited for applications where it may be desirable to use less viscosifying polymer to increase the viscosity of a treatment fluid because larger molecular weight galactomannans provide more viscosity on a per weight basis. Using less viscosifying polymer in a treatment fluid may be beneficial because less residue may be formed in a well from fracturing or other well stimulations, and because using less material may provide a cost savings with regard to material costs. Furthermore, smaller nonnatural galactomannans may be useful in applications where, for example, characteristic galactomannan chemistry (e.g., boron crosslinking) is desired, but not the high viscosity of typical guar galactomannans. Such is the case for "depolymerized" guar used in, for example, Halliburton MicroPolymer® fluid systems, commercially available from Halliburton Energy Services, Duncan, Okla.

The characteristics of nonnatural galactomannans that may be altered as compared to a wild type galactomannan include, but are not limited to, solubility, hydration rate, emulsifiability, gelability, thixotropicness (the property of various gels of becoming fluid when disturbed), pseudoplasticity (shear thinning), and dilatancy (shear thickening).

The M:G ratio of some nonnatural galactomannans also may make them suited for use in the treatment fluids of the present invention. Nonnatural galactomannans may be formed with different M:G ratios while maintaining other desirable properties of the polymer. For example, reducing the amount Gal substitution (higher M:G ratios) may increase crosslink efficiency or increase the viscosity of a treatment fluid through, among other things, the aggregation of bare poly-Man stretches of the polymer backbone. Alternatively, low M:G ratio nonnatural galactomannans could show faster hydration rates relative to natural guar galactomannans from, among other things, more Gal side chains.

A. Treatment Fluids of the Present Invention.

The treatment fluids of the present invention comprise an aqueous base fluid and a gelling agent that comprises a non-natural galactomannan. In some embodiments, the treatment fluids of the present invention also may comprise other additives including, for example, a crosslinking agent, a second gelling agent, particulates (such as proppant or gravel), and other additives typically used in subterranean treatment fluids. In some embodiments, the nonnatural galactomannan may be at least partially crosslinked.

The aqueous base fluid of the treatment fluids of the present invention may comprise fresh water, saltwater (e.g., water containing one or more salts dissolved therein), brine (e.g., saturated salt water), or seawater. The water can be from any source if it does not contain an excess of compounds that adversely affect other components in the treatment fluid.

The nonnatural galactomannan used in the treatment fluids of the present invention may be used in any amount sufficient to achieve a desired result. In certain embodiments, the nonnatural galactomannan is present in the treatment fluids of the present invention in an amount in the range of from about 0.1% to about 10% by weight of the aqueous base fluid therein. In other embodiments, the nonnatural galactomannan is present in the treatment fluids of the present invention in an amount in the range of from about 0.1% to about 1% by weight of the aqueous base fluid therein.

The treatment fluids of the present invention may comprise a combination of one or more nonnatural galactomannans or a combination of one or more nonnatural galactomannans and one or more other gelling agents. Such combinations may act synergically to increase viscosity or antagonistically to reduce it. For example, guar gum shows viscosity synergy with xanthan gum. But with casein, it becomes slightly thixotropic, forming a biphasic system containing casein micelles. Thus, a combination of nonnatural galactomannans with different properties may be chosen to achieve a desired result.

The nonnatural galactomannans present in the treatment fluid of the present invention may be at least partially crosslinked, among other things, to increase the viscosity of the treatment fluid. Any suitable crosslinking agent may be used. Suitable crosslinking agents include, but are not limited to, boron compounds (e.g., boric acid, disodium octaborate tetrahydrate, sodium diborate and pentaborates, ulexite, and colemanite); zirconium compounds (e.g., zirconium lactate, zirconium lactate triethanolamine, zirconium carbonate, zirconium acetylacetonate, zirconium malate, zirconium citrate, and zirconium diisopropylamine lactate); titanium compounds (e.g., titanium lactate, titanium malate, titanium citrate, titanium ammonium lactate, titanium triethanolamine, and titanium acetylacetonate); aluminum compounds (e.g., aluminum lactate or aluminum citrate); antimony compounds; chromium compounds; iron compounds; copper compounds; zinc compounds; or a combination thereof. An example of a suitable commercially available zirconium-based crosslinking agent is "CL-24" available from Halliburton Energy Services, Inc., Duncan, Okla. An example of a suitable commercially available titanium-based crosslinking agent is "CL-39" available from Halliburton Energy Services, Inc., Duncan Okla. The crosslink created by the crosslinking agent may be temporary, reversible, or permanent.

In certain embodiments, the crosslinking agents may be present in the treatment fluids of the present invention in an amount in the range from about 0.001% to about 10% by weight of the aqueous base fluid therein. In other embodiments, the crosslinking agent may be present in the treatment fluids of the present invention in an amount in the range from about 0.01% to about 1% by weight of the aqueous base fluid therein. Individuals skilled in the art, with the benefit of this disclosure, will recognize the exact type and amount of crosslinking agent to use depending on factors such as the specific nonnatural galactomannan used, desired viscosity, and formation conditions.

Optionally, additional gelling agents (e.g., crosslinked gelling agents) also may be added to the treatment fluids of the present invention. When added to the treatment fluids of the present invention, the gelling agent may be chosen such that it may be capable of crosslinking with a nonnatural galactomannan or such that it may not be capable of crosslinking with a nonnatural galactomannan, which also may depend on the crosslinking agent chosen to effect the crosslinks. Similarly, when a crosslinking agent is added to a treatment fluid, it may be chosen such that only gelling agent molecules present in the treatment fluid are crosslinked; or it may be chosen such that only nonnatural galactomannan molecules are crosslinked; or it may be chosen such that nonnatural galactomannan molecules and gelling agent molecules are crosslinked.

When included, a variety of gelling agents can be used in conjunction with the treatment fluids of the present invention. Suitable gelling agents typically comprise biopolymers, synthetic polymers, or a combination thereof. Examples of suitable biopolymers include, but are not limited to, guar gum and derivatives thereof, such as hydroxypropyl guar and carboxymethylhydroxypropyl guar, and cellulose derivatives, such as hydroxyethyl cellulose. Examples of such synthetic polymers include, but are not limited to, polyacrylate, polymethacrylate, polyacrylamide, polyvinyl alcohol, and polyvinylpyrrolidone. In some embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091, the relevant disclosure of which is incorporated herein by reference.

If an additional gelling agent is used, such a gelling agent may be included in an amount in the range of from about 0.01% to about 10% by weight of the aqueous base fluid therein. In certain embodiments, the gelling agent is present in the treatment fluids of the present invention in an amount in the range of from about 0.1% to about 4% by weight of the aqueous base fluid therein.

The treatment fluids of the present invention also may comprise breakers such as bases, acids, oxidizers, and enzymes. In certain embodiments, the action of a breaker may be delayed for a desired period. Examples of such delayed breakers include, but are not limited to, various lactones, esters, encapsulated acids and slowly soluble acid generating compounds, oxidizers that produce acids upon reaction with water, water reactive metals such as aluminum, lithium, and magnesium, and the like. Alternatively, any of the delayed breakers conventionally used with crosslinking agents may be used, for example, oxidizers such as sodium chlorite, sodium bromate, sodium persulfate, ammonium persulfate, encapsulated sodium persulfate, potassium persulfate, or ammonium persulfate, and the like, as well as magnesium peroxide. Enzyme breakers that may be employed include, but are not limited to, alpha- and beta-amylases, amyloglucosidase, invertase, maltase, cellulase, and hemicellulase, combinations thereof, and the like. The specific breaker used, whether or not it is encapsulated, and the amount thereof employed, will depend upon the breaking time desired, the nature of the nonnatural galactomannan and crosslinking agent, formation characteristics and conditions, and other factors known, with the benefit of this disclosure, to individuals skilled in the art.

In certain embodiments, the treatment fluids of the present invention may comprise particulate materials like proppant or gravel that can be utilized in, for example, fracturing or gravel packing operations. Suitable particulate materials include, but are not limited to, graded walnut or other nut shells, resin-coated walnut or other nut shells, graded sand, resin-coated sand, sintered bauxite, various particulate ceramic materials, glass beads, various particulate polymeric materials, and the like. The particular size of the particulate material employed may depend on the particular application, for which the particulate materials are being used, characteristics of the subterranean formation, and characteristics of the particular treatment fluid being used, as well as other variables. Generally, the sizes of suitable particulates may vary in the range of from about 2 mesh to about 200-mesh, U.S. Sieve Series scale. One of ordinary skill in the art, with the benefit of this disclosure, will be able to choose an appropriate particulate material for a given application.

B. Methods of Using the Treatment Fluids of the Present Invention.

The treatment fluids of the present invention can be used for carrying out a variety of subterranean well treatments, including, but not limited to, drilling, fracturing, gravel packing, frac-packing, and plugging. In certain embodiments, in which a treatment fluid is used in conjunction with fracturing operations, fracturing fluids comprising an aqueous base fluid and a nonnatural galactomannan may be placed in a subterranean formation at a sufficient pressure to create or enhance one or more fractures therein. After the fracturing fluid has performed its desired function, or after a desired period of time, the viscosity of the fracturing fluid may be reduced and the fracturing fluid recovered. In an example of such a fracturing embodiment, a method of fracturing a subterranean formation comprises: providing a treatment fluid comprising: an aqueous base fluid and a gelling agent that comprises a nonnatural galactomannan, wherein the nonnatural galactomannan is formed from a genetically modified plant or part of a genetically modified plant; and placing the fracturing fluid in the subterranean formation at a pressure sufficient to create or enhance one or more fractures therein.

In certain embodiments, in which the treatment fluids of the present invention are used in conjunction with gravel packing operations, gravel packing fluids comprising an aqueous base fluid and a nonnatural galactomannan are placed in a portion of a well bore so as to create a gravel pack. After the gravel pack is substantially in place, the viscosity of the gravel packing fluid may be reduced and the gravel packing fluid recovered. In an example of such a gravel packing embodiment, a method for placing a gravel pack in a subterranean formation comprises: providing a treatment fluid comprising: an aqueous base fluid and a gelling agent that comprises a nonnatural galactomannan, wherein the nonnatural galactomannan is formed from a genetically modified plant or part of a genetically modified plant; and placing the gravel packing fluid in a portion of a well bore so as to create a gravel pack therein.

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims. The terms in the claims have their plain, ordinary meaning, unless otherwise explicitly and clearly defined by the patentee.

What is claimed is:

1. A method comprising:
   providing a treatment fluid comprising: an aqueous base fluid and a gelling agent that comprises a nonnatural galactomannan, wherein the nonnatural galactomannan is formed by a method that comprises at least one step chosen from expressing a galactomannan biosynthetic enzyme, expressing a modified galactomannan biosynthetic enzyme, inactivating a galactomannan biosynthetic enzyme, and down-regulating a galactomannan biosynthetic enzyme and wherein the nonnatural galactomannan has an M:G ratio less than about 1.6:1 or greater than about 1.8:1; and
   placing the treatment fluid into a subterranean formation.

2. The method of claim 1 wherein the nonnatural galactomannan is isolated from at least a part of a genetically modified plant.

3. The method of claim 1 wherein the nonnatural galactomannan has an average molecular weight less than or greater than about 2 million Daltons.

4. The method of claim 1 wherein the nonnatural galactomannan is formed by a method that comprises altering the normal galactomannan biosynthetic pathway in a plant.

5. The method of claim 1 wherein the nonnatural galactomannan is formed by a method that comprises: forming at least one expression cassette, the expression cassette comprising at least one galactomannan nucleic acid sequence; transforming a plant cell with the expression cassette; expressing the at least one galactomannan nucleic acid sequence from the expression cassette in the plant cell; and forming the nonnatural galactomannan.

6. The method of claim 1 wherein the gelling agent is at least partially crosslinked.

7. The method of claim 1 wherein the treatment fluid further comprises a breaker.

8. The method of claim 1 wherein the treatment fluid further comprises a particulate material.

9. A method comprising:
   providing a treatment fluid comprising: an aqueous base fluid and a gelling agent that comprises a nonnatural galactomannan, wherein the nonnatural galactomannan has an M:G ratio less than about 1.6:1 or greater than about 1.8:1; and
   placing the treatment fluid into a subterranean formation.

10. The method of claim 9 wherein the nonnatural galactomannan is isolated from at least a part of a genetically modified plant.

11. The method of claim 9 wherein the nonnatural galactomannan has an average molecular weight less than or greater than about 2 million Daltons.

12. The method of claim 9 wherein the nonnatural galactomannan is formed by a method that comprises altering the normal galactomannan biosynthetic pathway in a plant.

13. The method of claim 9 wherein the nonnatural galactomannan is formed by a method that comprises at least one step chosen from expressing a galactomannan biosynthetic enzyme, expressing a modified galactomannan biosynthetic enzyme, inactivating a galactomannan biosynthetic enzyme, up-regulating a galactomannan biosynthetic enzyme, and down-regulating a galactomannan biosynthetic enzyme.

14. The method of claim 9 wherein the nonnatural galactomannan is formed by a method that comprises: forming at least one expression cassette, the expression cassette comprising at least one galactomannan nucleic acid sequence; transforming a plant cell with the expression cassette; expressing the at least one galactomannan nucleic acid sequence from the expression cassette in the plant cell; and forming the nonnatural galactomannan.

15. The method of claim 9 wherein the gelling agent is at least partially crosslinked.

16. The method of claim 9 wherein the treatment fluid further comprises a breaker.

17. The method of claim 9 wherein the treatment fluid further comprises a particulate material.

18. A method comprising:
   providing a treatment fluid comprising: an aqueous base fluid and a gelling agent that comprises a nonnatural galactomannan, wherein the nonnatural galactomannan has an average molecular weight less than or greater than about 2 million Daltons and wherein the nonnatural galactomannan has an M:G ratio less than about 1.6:1 or greater than about 1.8:1; and
   placing the treatment fluid into a subterranean formation.

19. The method of claim 18 wherein the nonnatural galactomannan is formed by a method that comprises at least one step chosen from expressing a galactomannan biosynthetic enzyme, expressing a modified galactomannan biosynthetic enzyme, inactivating a galactomannan biosynthetic enzyme, up-regulating a galactomannan biosynthetic enzyme, and down-regulating a galactomannan biosynthetic enzyme.

* * * * *

UNITED STATES PATENT AND TRADEMARK OFFICE
CERTIFICATE OF CORRECTION

PATENT NO. : 7,585,818 B2 Page 1 of 1
APPLICATION NO. : 11/125732
DATED : September 8, 2009
INVENTOR(S) : Michael J. R. Segura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1032 days.

Signed and Sealed this

Fourteenth Day of September, 2010

David J. Kappos
*Director of the United States Patent and Trademark Office*